United States Patent
Wu et al.

(10) Patent No.: US 8,773,886 B2
(45) Date of Patent: Jul. 8, 2014

(54) MEMORY ARRAY WITH CO-PLANAR WAVEGUIDE BASED MEMORY ELEMENT SELECTION

(75) Inventors: Wei Wu, Palo Alto, CA (US); John Paul Strachan, Millbrae, CA (US); Antonio Carlos Torrezan de Sousa, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/213,412

(22) Filed: Aug. 19, 2011

(65) Prior Publication Data

US 2013/0044533 A1 Feb. 21, 2013

(51) Int. Cl.
*G11C 11/00* (2006.01)

(52) U.S. Cl.
USPC .......................................... 365/148; 365/205

(58) Field of Classification Search
USPC ................................................. 365/148, 205
See application file for complete search history.

(56) References Cited

U.S. PATENT DOCUMENTS

| | | | |
|---|---|---|---|
| 7,701,791 B2 | 4/2010 | Rinerson et al. | |
| 2002/0044720 A1 | 4/2002 | Brophy et al. | |
| 2009/0323391 A1* | 12/2009 | Scheuerlein et al. | 365/148 |
| 2010/0078759 A1* | 4/2010 | Sekar et al. | 257/530 |
| 2010/0097832 A1* | 4/2010 | Mukai et al. | 365/51 |
| 2010/0272386 A1 | 10/2010 | Fu et al. | |
| 2011/0122676 A1* | 5/2011 | Murooka et al. | 365/148 |
| 2012/0008364 A1* | 1/2012 | Lai et al. | 365/103 |

FOREIGN PATENT DOCUMENTS

WO    WO-2010105993 A2    9/2010

OTHER PUBLICATIONS

Honda, K. et al., Elimination of Half Select Disturb in 8t-sram by Local Injected Electron Asymmetric Pass Gate Transistor, Custom Integrated Circuits Conference (CICC), IEEE, Sep. 19-22, 2010, pp. 1-4.

* cited by examiner

*Primary Examiner* — Hoai V Ho

(57) ABSTRACT

A memory array with co-planar waveguide based memory selection includes a first set of parallel conductive lines placed perpendicular to a second set of parallel conductive lines, memory elements disposed at intersections between the first set of conductive lines and the second set of conductive lines, and selection circuitry to apply an reading electrical condition to a selected one of the conductive lines and to ground conductive lines adjacent to the selected conductive line to form a co-planar waveguide.

20 Claims, 6 Drawing Sheets

MEMORY ARRAY WITH CO-PLANAR WAVEGUIDE BASED MEMORY ELEMENT SELECTION

BACKGROUND

As the use of digital data increases, the demand for faster, smaller, and more efficient memory structures increases. One type of memory structure that has recently been developed is a crossbar memory structure. A crossbar memory structure includes a first set of conductive lines that intersect a second set of parallel conductive lines. A programmable memory element configured to store digital data is placed at each intersection of the lines.

One type of programmable memory element which may be used is a memristive element. A memristive element is a device which changes the state of its resistance based on an applied programming condition. For example, a programming condition may be applied to change the memristive element from a high resistive state to a low resistive state or vice versa. A high resistive state may represent a digital "1" and a low resistive state may represent a digital "0".

One challenge that results from use of a crossbar memory structure is the process of reading the state of a target memory element. The state of a memory element may be determined by applying a read voltage on one side of the target memory element. The voltage measured by a sense element on the other side of the target memory element will be indicative of the state of the target memory element. However, when applying a read voltage to a target memory element, the current sensed by the sensing circuitry includes current flowing through as well as currents flowing through unselected and half-selected memory elements within the crossbar array. Thus, it is difficult to isolate the current flowing through the target memory element that is a direct result of the applied read voltage.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, when applying a read voltage to a target memory element, the current sensed by the sensing circuitry includes current flowing through as well as currents flowing through unselected and half-selected memory elements within the crossbar array. Thus, it is difficult to isolate the current flowing through the target memory element that is a direct result of the applied read voltage.

In light of this and other issues, the present specification discloses a method for selecting a memory element within a crossbar array such that sensing circuitry can more easily distinguish electric current flowing through the selected memory element among noise currents. According to certain illustrative examples, a target memory element is selected by applying an electrical condition such as a voltage pulse between the two lines connected to that target memory element. Additionally, the conductive lines that are adjacent to the selected lines connecting to the target memory element are grounded. The structure and spacing of the conductive lines is such that a co-planar waveguide is formed by grounding the adjacent lines.

A co-planar waveguide allows an applied electrical condition such as a voltage pulse to propagate down the line with little dispersion. Thus, the voltage pulse will remain narrow as it travels down the line to which it is applied. Because the voltage pulse remains narrow, the electric current flowing through the selected target memory element will be more easily distinguished among the half-select currents and sneak currents.

Through use of methods and systems embodying principles described herein, memory elements within a crossbar array can be effectively accessed for reading and writing purposes. Specifically, a memory element can be selected and written without affecting the states of other memory elements within the array. Furthermore, the state of a selected memory element within the array can be accurately determined.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
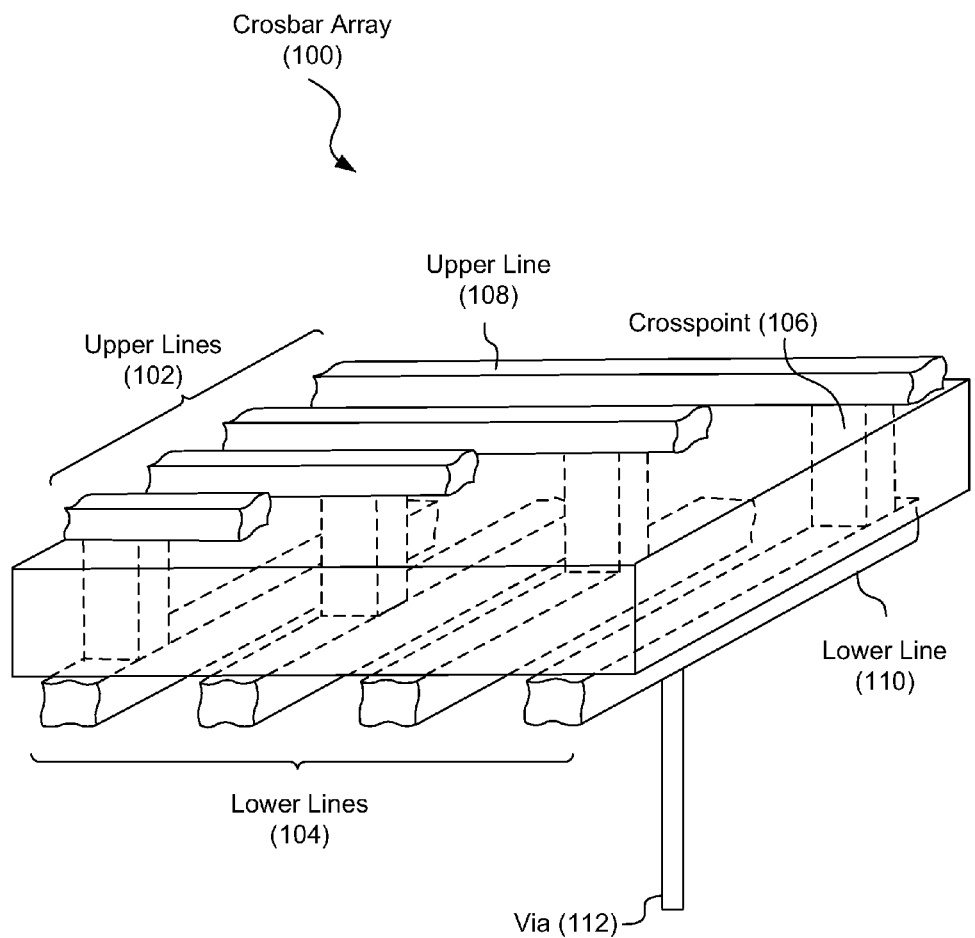
FIG. 1 is a diagram showing an illustrative crossbar array, according to one example of principles described herein.

Referring now to the figures, FIG. 1 is a diagram showing an illustrative crossbar memory architecture (100). According to certain illustrative examples, the crossbar architecture (100) may include an upper set of lines (102) which may generally be in parallel. Additionally, a lower set of lines (104) may be generally perpendicular to and intersect the upper lines (102). Programmable crosspoint devices (106) are formed at the intersections between an upper line (108) and a lower line (110).

According to certain illustrative examples, the programmable crosspoint devices (106) may be memristive devices. Memristive devices exhibit a "memory" of past electrical conditions. For example, a memristive device may include a matrix material which contains mobile dopants. These dopants can be moved within a matrix to dynamically alter the electrical operation of an electrical device.

The motion of dopants can be induced by the application of a programming condition such as an applied electrical voltage across a suitable matrix. The programming voltage generates a relatively high electrical field through the memristive matrix and alters the distribution of dopants. After removal of the electrical field, the location and characteristics of the dopants remain stable until the application of another programming electrical field. For example, by changing the dopant configurations within a memristive matrix, the electrical resistance of the device may be altered. The memristive device is read by applying a lower reading voltage which allows the internal electrical resistance of the memristive device to be sensed but does not generate a high enough electrical field to cause significant dopant motion. Consequently, the state of the memristive device may remain stable over long time periods and through multiple read cycles.

According to certain illustrative examples, the crossbar architecture (100) may be used to form a non-volatile memory array. Non-volatile memory has the characteristic of not losing its contents when no power is being supplied. Each of the programmable crosspoint devices (106) is used to represent one or more bits of data. Although individual crossbar lines (108, 110) in FIG. 1 are shown with rectangular cross sections, crossbars may also have square, circular, elliptical, or more complex cross sections. The lines may also have many different widths, diameters, aspect ratios and/or eccentricities. The crossbars may be nanowires, sub-microscale wires, microscale wires, or wires with larger dimensions.

According to certain illustrative examples, the crossbar architecture (100) may be integrated into a Complimentary Metal-Oxide-Semiconductor (CMOS) circuit or other conventional computer circuitry. Each individual wire segment may be connected to the CMOS circuitry by a via (112). The via (112) may be embodied as an electrically conductive path through the various substrate materials used in manufacturing the crossbar architecture. This CMOS circuitry can provide additional functionality to the memristive device such as input/output functions, buffering, logic, configuration, or other functionality. Multiple crossbar arrays can be formed over the CMOS circuitry to create a multilayer circuit.

Figure 2A:
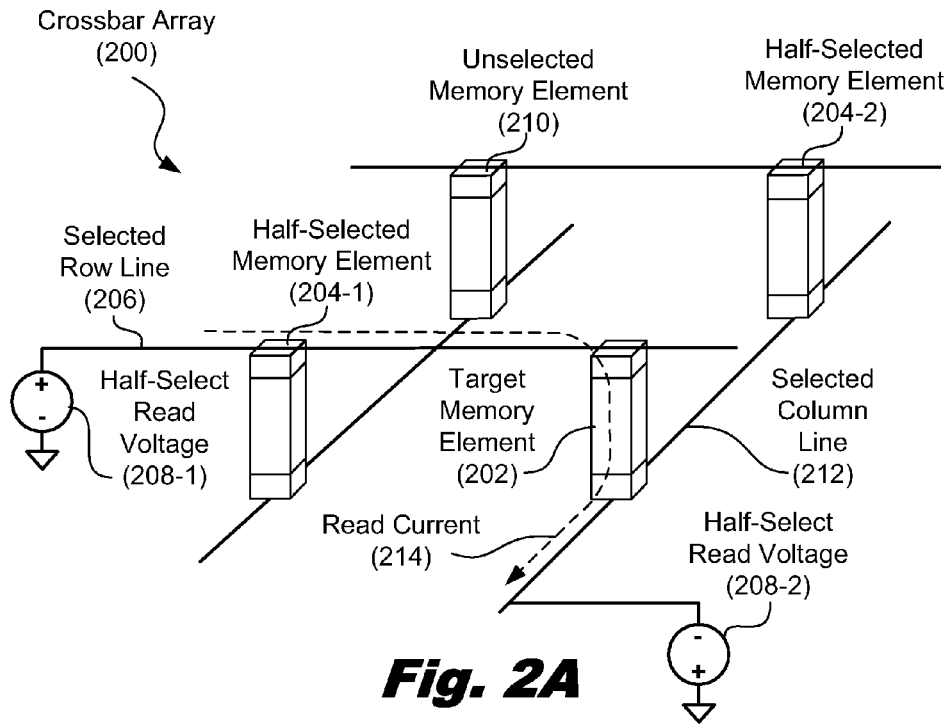
FIG. 2A is a diagram showing an illustrative read current flowing through a crossbar array, according to one example of principles described herein.
Figure 2B:
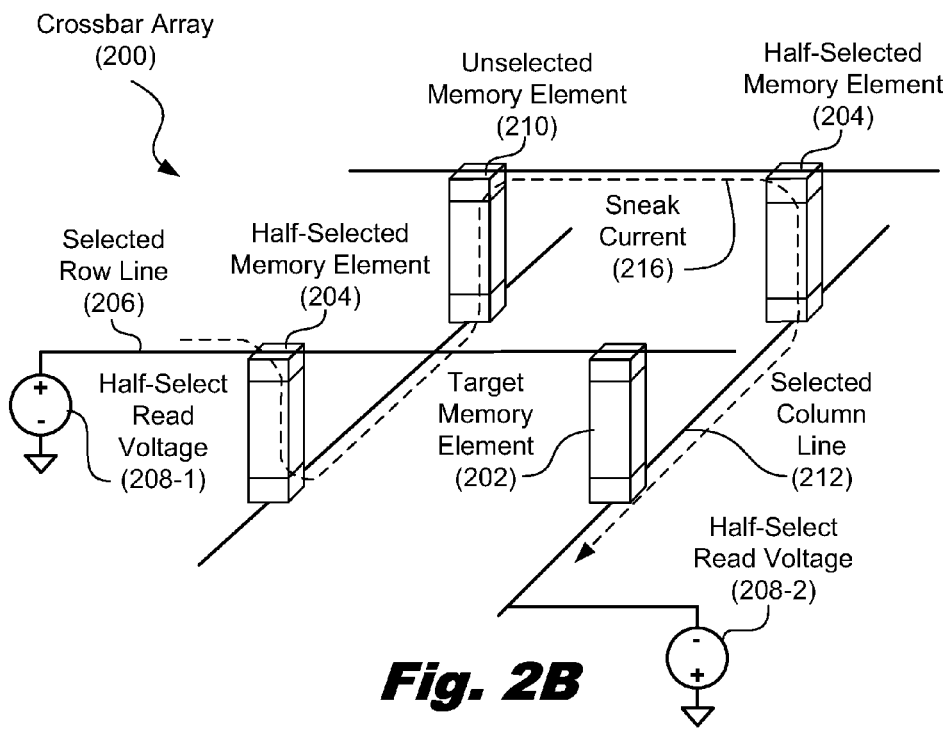
FIG. 2B is a diagram showing an illustrative sneak current flowing through a crossbar array, according to one example of principles described herein.

FIGS. 2A-2B are diagrams showing an illustrative section of a crossbar array (200) with a read voltage applied. As mentioned above, a crossbar array is formed by placing memory elements at intersections between row lines and column lines. To access a particular memory element, a voltage is applied across that element. The memory element to be accessed will be referred to as the target memory element (202). The first set of parallel lines will be referred to as row lines and the second set of parallel lines will be referred to as column lines. The following will describe an example of how to access the target memory element (202) for a reading operation.

To read the state of the target memory element (202), a half-select read voltage (208-1) is applied to the row line (206) connected to the target memory element (202). This row line will be referred to as the selected row line (206). With the half-select read voltage applied, each memory element (204-1) along the selected row line (206), including the target memory element (202) becomes half selected. To fully select the target memory element (202), a half-select read voltage (208-2) is applied to the column line connected to the target memory element (202). This column line is referred to as the selected column line (212). With the half-select read voltage (208-2) applied to the selected column line (212), the memory elements (204-2) along the selected column line will become half selected, except for the target memory element (202) which becomes fully selected. The half-select read voltage (208-2) applied to the column line (212) will be the inverse polarity of the half-select read voltage (208-1) applied to the selected row line (206). This will cause the voltage drop across the target memory element (202) to be the sum of both half-select read voltages (208-1, 208-2).

With the full voltage applied across the target memory element (202), a read current (214) flows through the selected row line (206), the target memory element (202), and the selected column line (212). The value of the read current will be indicative of the state of the target memory element (202). Thus, sensing circuitry can be used to measure the read current and determine whether the target memory element is storing a digital '1' or a digital '0'.

As mentioned above, when applying half-select read voltages to the row lines and column lines, memory elements (204-1, 204-2) along those lines become half selected. This causes an electric current to flow through these memory elements (204) as well.

FIG. 2B illustrates a possible path of a sneak current (216). The sneak current (216) may flow through unselected memory elements (210) as well as half-selected memory elements (204). The value of the sneak current (216) is dependent on the current to voltage relationship of the memory elements. The sneak current (216) will interfere with the read current (214) and make it difficult for the sensing circuitry to accurately determine the state of the target memory element (202).

In light of this issue, the present specification discloses a method for selecting a target memory element (202) in a manner that allows sensing circuitry to more accurately determine the state of that target memory element. As mentioned above, this is done by grounding lines that are adjacent to a selected line to form a co-planar waveguide.

Figure 3:
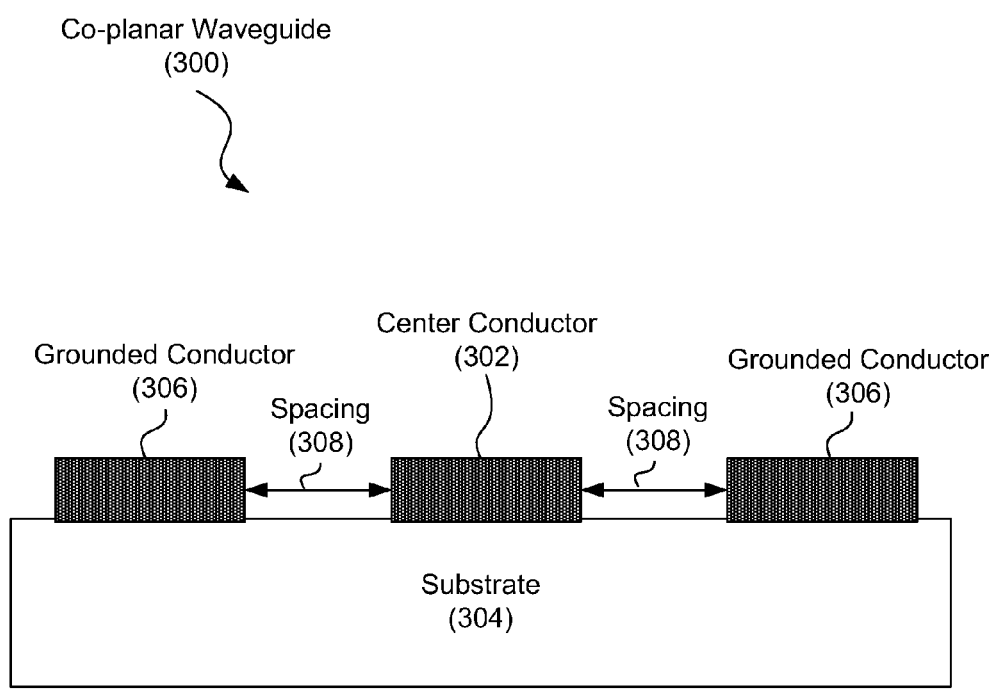
FIG. 3 is a diagram showing an illustrative co-planar waveguide, according to one example of principles described herein.

FIG. 3 is a diagram showing an illustrative co-planar waveguide. According to certain illustrative examples, a co-planar waveguide is formed by a center conductor (302) formed onto a substrate (304). Grounded conductors (306) are then placed on both sides of the center conductor (302). In the case of a memristor crossbar array, the center conductor (302) corresponds to a selected line and the grounded conductors (306) correspond to the adjacent grounded lines. The substrate (304) corresponds to the layer in which the memristive memory elements are formed.

An applied electrical condition such as a voltage pulse will propagate through the center conductor (302) differently with the adjacent conductors (306) being grounded than if there were no adjacent grounded conductors (306). The manner in which the electrical condition propagates is determined by a variety of characteristics of the co-planar waveguide including the electrical characteristics of the substrate (304) and the spacing (308) between the conductors (302, 306).

Figure 4:
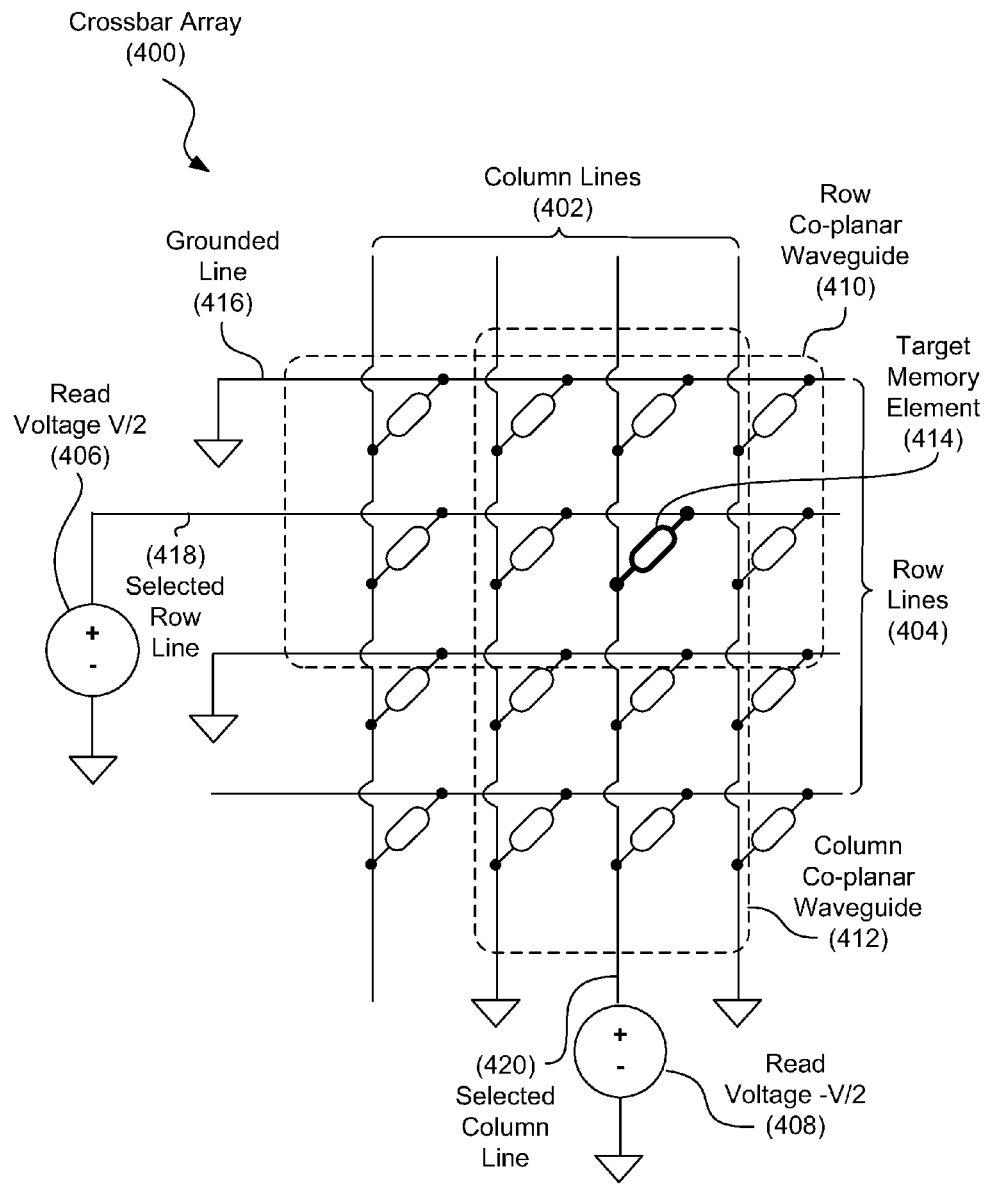
FIG. 4 is a diagram showing an illustrative crossbar array with co-planar waveguide based memory element selection, according to one example of principles described herein.

FIG. 4 is a diagram showing an illustrative crossbar array (400) with co-planar waveguide based memory element selection. According to certain illustrative examples, the crossbar memory array includes a set of row lines (404) that intersect a set of column lines (402). Memory elements are disposed between intersections of the row lines (404) and column lines (402).

To select a particular target memory element, the row line connected to that memory element (414) is selected. This line is referred to as the selected row line (418). The lines adjacent to the selected row line (418) are then grounded. These grounded lines (416) will form part of a co-planar waveguide which will be referred to as the row co-planar waveguide (410). Additionally, the column line connected to the target memory element is selected. This line will be referred to as the selected column line (420). The lines adjacent to the selected column line (420) are also grounded. This will form a second co-planar waveguide which will be referred to as the column co-planar waveguide (412).

In one example, an electrical condition can be applied to the target memory element (414) by applying a first half of a read voltage (406) pulse to the selected row line (418) and an inverted half of the read voltage (408) pulse to the selected column line (420). For example, if a read voltage of V=2 volts, then a positive 1 volt is applied to the selected row line (418) while a negative 1 volt is applied to the selected column line (420).

By creating a co-planar waveguide for selected lines (418, 420), an applied narrow voltage pulse will remain narrow as it propagates through the line. Without the co-planar waveguide, the voltage pulse will be prone to dispersion. This means that the originally narrow voltage pulse will become broader and smaller in amplitude. By keeping the voltage pulse narrow, then the resulting electric current flowing through the selected memory element will be more clearly distinguishable from background currents.

The process of forming a co-planar waveguide may be used to set the state of a memory element within the array as well as to determine the state of a memory element. In one example, to write the state of a memory element, a first half of a write voltage is applied to the selected row line while a second inverted half of the write voltage is applied to the selected column line. The write voltage will generally be greater than a read voltage. The write voltage is of sufficient value to change the state of the selected memory element without adversely affecting the state of unselected and half-selected memory elements within the array.

Figure 5:
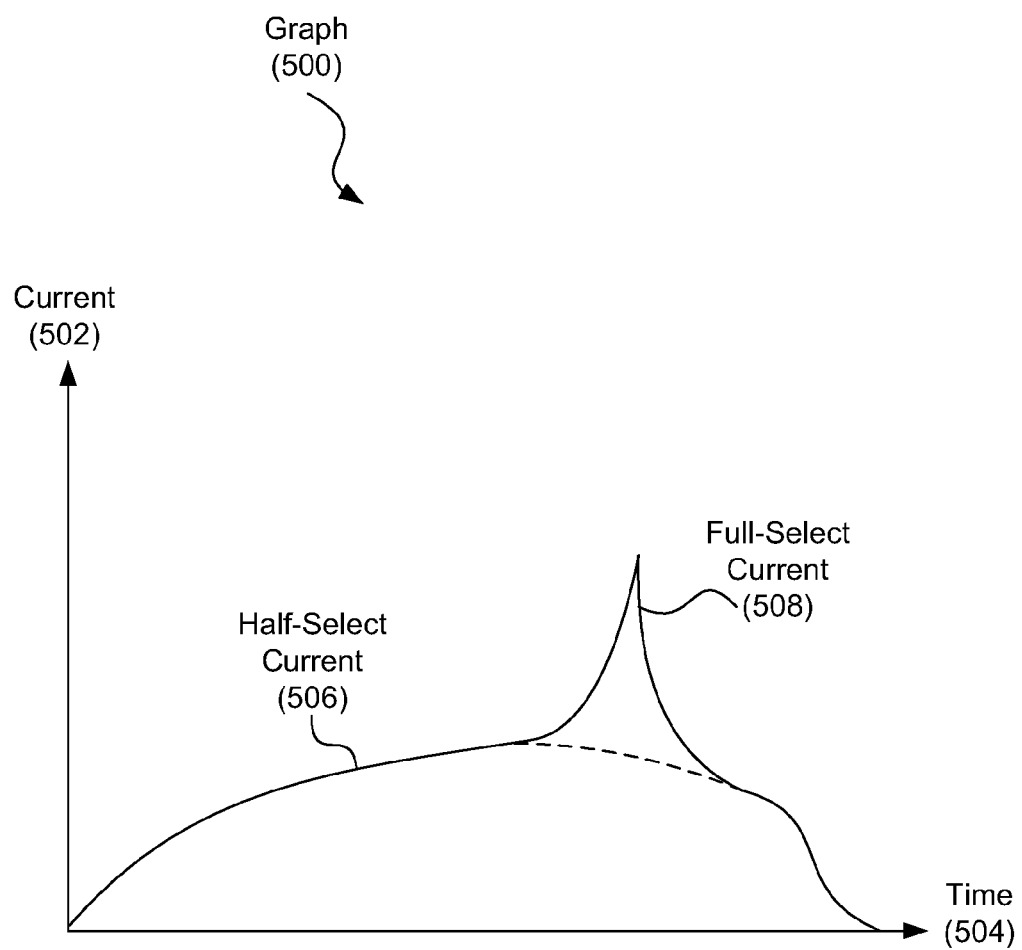
FIG. 5 is a diagram showing an illustrative graph of electrical conditions applied to a memory element within a crossbar array, according to one example of principles described herein.

FIG. 5 is a diagram showing an illustrative graph (500) of electrical conditions applied to a memory element within a crossbar array. The vertical axis represents electric current (502) while the horizontal axis represents time (504). The graph (500) shows the electric current as sensed by a sense amplifier connected to a selected line connected to a target memory element.

According to certain illustrative examples, the sense amplifier will detect a broad current pulse over time as a result of half-select currents (506). These half-select currents (506) result in sneak paths that flow through the array. Because the sneak currents flow through conductive lines that do not form a co-planar waveguide, they are prone to dispersion. Thus, instead of a narrow current pulse, the half-select currents become a broad pulse that is lower in amplitude.

Conversely, the full-select current (508) remains as a narrow pulse. The full-select current is the current flowing through the sense amplifier that is a result of the voltage pulses applied to both the selected row line and the selected column line. The full-select current remains narrow due to the co-planar waveguide characteristics over which the narrow voltage pulses travel. Because the full-select current remains narrow, it is easily distinguished among the half-select currents (506).

The value of the full-select current can be used to determine the state of the selected memory element. For example, if the full-select current is relatively low, then it can be determined that the selected memory element is in a high resistive state representing a logical '0'. Conversely, if the full-select current (506) is relatively high, then it can be determined that the selected memory element is in a low resistive state representing a logical '1'.

Figure 6:
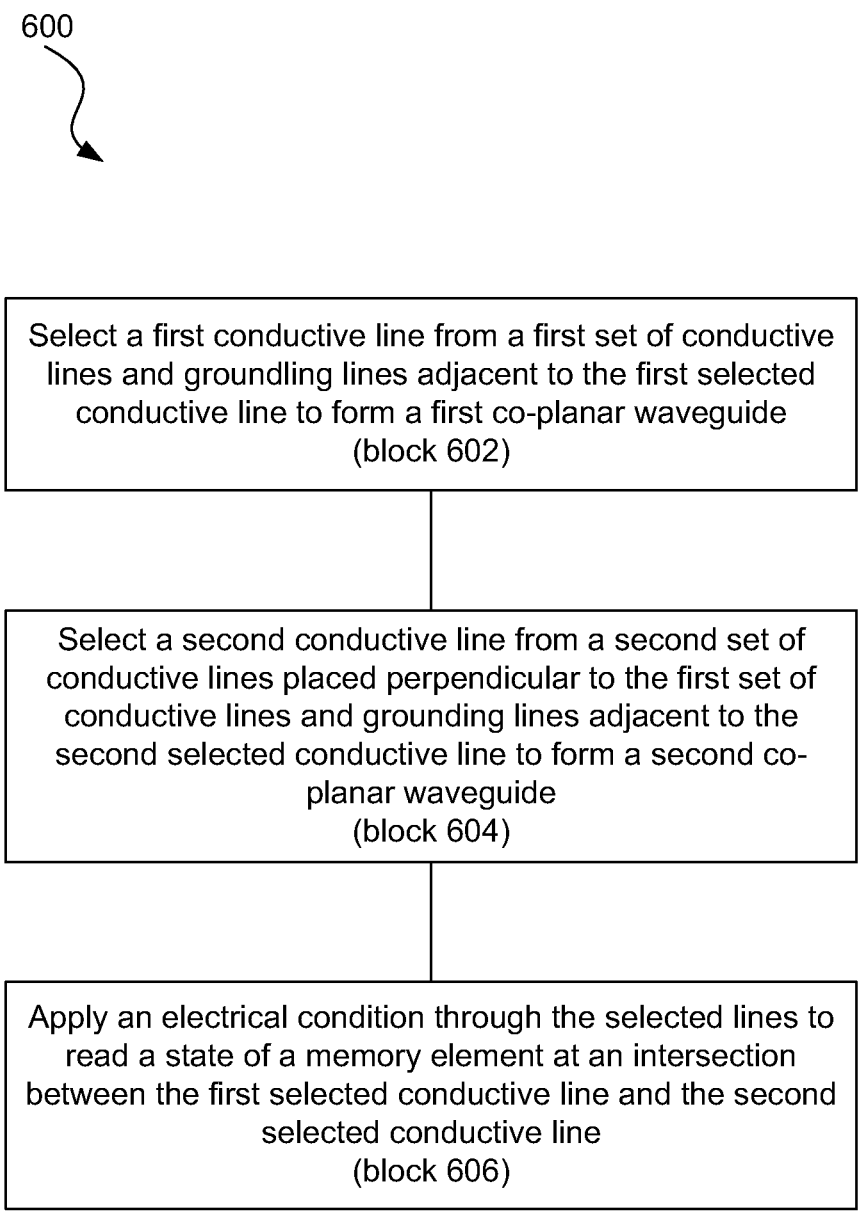
FIG. 6 is a flowchart showing an illustrative method for co-planar waveguide based memory element selection, according to one example of principles described herein.

FIG. 6 is a flowchart showing an illustrative method (600) for co-planar waveguide based memory element selection. According to certain illustrative examples, the method includes selecting (block 602) a first conductive line from a first set of conductive lines and groundling lines adjacent to the first selected conductive line to form a first co-planar waveguide, selecting (block 604) a second conductive line from a second set of conductive lines placed perpendicular to the first set of conductive lines and grounding lines adjacent to the second selected conductive line to form a second co-planar waveguide, and applying (block 606) an electrical condition through the selected lines to read a state of a memory element at an intersection between the first selected conductive line and the second selected conductive line In conclusion, through use of systems and methods embodying principles described herein, an efficient manner of selecting memory elements within a crossbar array is realized. Particularly, by structuring the array so that the conductive lines can be used to form a co-planar waveguide allows an applied electrical condition such as a voltage pulse to remain narrow as it propagates down the selected conductive lines. This allows sensing circuitry to more readily distinguish the electric current flowing through a selected memory element in order to determine the state of that memory element. Additionally, it allows writing circuitry to set the state of a target memory element without adversely affecting the state of other memory elements within the array.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A memory array with co-planar waveguide based memory selection, the memory array comprising:
   a first set of parallel conductive lines placed perpendicular to a second set of parallel conductive lines;
   memory elements disposed at intersections between said first set of conductive lines and said second set of conductive lines;
   selection circuitry to apply an electrical condition to a selected one of said first set of said parallel conductive lines and to ground conductive lines adjacent to said selected conductive line to form a co-planar waveguide; and
   sensing circuitry to determine whether a signal is a full select current based on an amplitude of said signal.

2. The memory array of claim 1, wherein said selection circuitry is to apply said electrical condition by applying half of said electrical condition to one of said first set of conductive lines and an inverted half of said electrical condition to one of said second set of conductive lines.

3. The memory array of claim 1, wherein said electrical condition comprises a voltage pulse.

4. The memory array of claim 1, wherein said selection circuitry comprises a sense amplifier to sense a current flowing through a selected memory element.

5. The memory array of claim 4, wherein said electrical condition is of sufficient value so as to allow said sense amplifier to determine a state of said selected memory element among noise currents.

6. The memory array of claim 1, wherein a spacing between said sets of conductive lines is such that said electrical condition behaves in accordance with a predefined design criterion.

7. The memory array of claim 1, wherein said memory elements comprise memristive devices.

8. A method for co-planar waveguide based crossbar memory array element selection, the method comprising:

selecting a first conductive line from a first set of conductive lines and groundling lines adjacent to said first selected conductive line to form a first coplanar waveguide;

selecting a second conductive line from a second set of conductive lines placed perpendicular to said first set of conductive lines and grounding lines adjacent to said second selected conductive line to from a second co-planar waveguide;

applying an electrical condition through said first and second selected conductive lines to interact with a memory element at an intersection between said first selected conductive line and said second selected conductive line; and determining that a signal sensed with sensing circuitry is a full select current based on an amplitude of signal.

9. The method of claim 8, wherein to interact with said memory element comprises one of: setting a state of said memory element and determining a state of said memory element.

10. The method of claim 8, wherein said electrical condition is applied by applying a half of said electrical condition to said first selected conductive line and an inverted half of said second selected conductive line.

11. The method of claim 8, wherein said electrical condition comprises a voltage pulse.

12. The method of claim 11, further comprising, with a sense amplifier, sensing an electrical current flowing through said selected memory element resulting from said voltage pulse.

13. The method of claim 8, wherein a spacing between said sets of conductive lines is such that said electrical condition behaves in accordance with a predefined design criterion.

14. The method of claim 8, wherein said memory elements comprise memristive devices.

15. A memory array with co-planar waveguide based memory element selection, the memory array comprising:

a first set of parallel conductive row lines placed perpendicular to a second set of parallel conductive column lines;

memory elements disposed at intersections between said row lines and said column lines; and selection circuitry to:
apply a first half of a voltage pulse to a selected row line while grounding lines adjacent to said selected row line to form a row co-planar waveguide;

apply a second half of said voltage pulse to a selected column line while grounding lines adjacent to said selected lines to form a column co-planar waveguide; and determine whether a signal is a full select current based on an amplitude of said signal.

16. The memory array of claim 1, wherein said memory elements includes a matrix of materials that contain mobile dopants that can be moved with applied electrical voltages across said matrix, wherein such movement dynamically affect an electrical resistance of said memory elements.

17. The memory array of claim 1, wherein said co-planar waveguide exhibits a characteristic of preventing dispersion of signals propagating down said selected one of said conductive lines.

18. The memory array of claim 1, wherein said co-planar waveguide exhibits a characteristics of causing said full select currents to have higher amplitudes than half select currents on said selected one of said conductive lines.

19. The memory array of claim 1, wherein said sensing circuitry is configured to determine that said signal is a full select current if said signal has a larger amplitude than other signals passing through said sensing circuitry.

20. The method of claim 8, wherein determining that a signal sensed with sensing circuitry is a full select current based on an amplitude of signal includes distinguishing said full select current from half select current or sneak current.

* * * * *

UNITED STATES PATENT AND TRADEMARK OFFICE
CERTIFICATE OF CORRECTION

PATENT NO. : 8,773,886 B2
APPLICATION NO. : 13/213412
DATED : July 8, 2014
INVENTOR(S) : Wei Wu et al.

It is certified that error appears in the above-identified patent and that said Letters Patent is hereby corrected as shown below:

In The Claims

In column 7, line 2, in Claim 8, delete "groundling" and insert -- grounding --, therefor.

Signed and Sealed this
Sixth Day of January, 2015

Michelle K. Lee
*Deputy Director of the United States Patent and Trademark Office*